United States Patent
Cheng et al.

(10) Patent No.: US 8,152,136 B2
(45) Date of Patent: Apr. 10, 2012

(54) POLYMER MICROVALVE WITH ACTUATORS AND DEVICES

(75) Inventors: Ching-Hsiang Cheng, Kowloon (CN); Chen Chao, Kowloon (CN); Yin-Nee Cheung, Kowloon (CN)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 971 days.

(21) Appl. No.: 11/984,915

(22) Filed: Nov. 26, 2007

(65) Prior Publication Data
US 2009/0137874 A1   May 28, 2009

(51) Int. Cl.
*F16K 31/02*   (2006.01)
(52) U.S. Cl. ............. 251/129.06; 251/129.01; 251/333; 251/368; 604/891.1
(58) Field of Classification Search ............. 251/129.01, 251/129.06, 368, 11, 333–334, 331, 335.2; 604/891.1
See application file for complete search history.

(56) References Cited

U.S. PATENT DOCUMENTS

| | | | | |
|---|---|---|---|---|
| 3,979,105 A * | 9/1976 | Pool et al. | | 251/121 |
| 4,363,429 A * | 12/1982 | Schindler | | 222/504 |
| 5,069,419 A * | 12/1991 | Jerman | | 251/11 |
| 5,322,258 A * | 6/1994 | Bosch et al. | | 251/65 |
| 5,333,831 A * | 8/1994 | Barth et al. | | 251/11 |
| 5,429,713 A * | 7/1995 | Stevenson et al. | | 216/2 |
| 5,529,279 A * | 6/1996 | Beatty et al. | | 251/11 |
| 5,962,081 A | 10/1999 | Ohman et al. | | |
| 6,408,878 B2 * | 6/2002 | Unger et al. | | 137/597 |
| 6,656,162 B2 * | 12/2003 | Santini et al. | | 604/191 |
| 6,991,214 B2 | 1/2006 | Richter | | |
| 7,059,348 B2 * | 6/2006 | Nat | | 137/597 |
| 7,134,445 B2 * | 11/2006 | Broyer et al. | | 137/68.13 |
| 7,832,653 B2 * | 11/2010 | Yukimoto | | 236/92 B |
| 2005/0053504 A1 | 3/2005 | Yamanishi | | |
| 2006/0280906 A1 * | 12/2006 | Trentacosta et al. | | 428/137 |

FOREIGN PATENT DOCUMENTS

| | | |
|---|---|---|
| JP | 2000-046234 | 2/2000 |
| WO | WO 2006093149 A1 * | 9/2006 |

* cited by examiner

*Primary Examiner* — John Bastianelli
(74) *Attorney, Agent, or Firm* — The Hong Kong Polytechnic University

(57) ABSTRACT

The present invention relates to a microvalve having a valve plug, connecting legs, anchors and actuators, allowing the valve plug to move vertically to open or close the valve. The valve plug can contain magnetic materials, and be operated by an actuator.

8 Claims, 6 Drawing Sheets

POLYMER MICROVALVE WITH ACTUATORS AND DEVICES

Microvalves are well-known in the art, serving various purposes such as medicine administration, controlling fluid flow, printing, etc.

The present invention teaches a microvalve capable of opening and closing through the use of a plug that is connected to the microvalve but capable of moving up and down vertically into a slot. Movement of the plug can be brought about by actuator means, such as magnetically operated actuator, electrically operated actuator, etc.

The apparatus and methods of the present invention will become better understood from the following description, appended claims, and accompanying drawings where:

The following description of certain exemplary embodiment(s) is merely exemplary in nature and is in no way intended to limit the invention, its application, or uses.

Now, to FIGS. 1-6,

The present invention relates to polymer microvalve and methods of making such. The method of making includes using up to two masks of lithography steps for silicon microfabrication techniques. The present microvalve is formed with polymer-based material, allowing the microvalve to be inert to harsh environment, including acids, bases, and solvents.

Figure 1A:
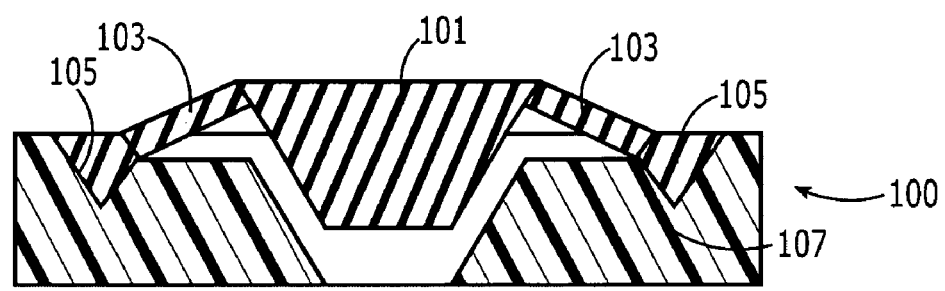
FIG. 1 shows the microvalve of the present invention.
Figure 1B:
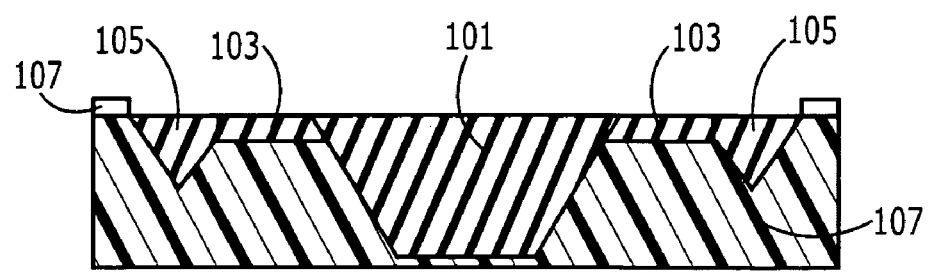

FIG. 1 shows the microvalve of the present invention, whereby (a) shows it in a pop-up state and (b) shows it in a closed state.

The microvalve 100 is fixed in a silicon member 107. As will be discussed later, the silicon member 107 is anisotropically etched to provide a sidewall slope of 54.74°. The silicon member 107 includes different depths.

The microvalve 100 further includes a valve plug 101, connecting legs 103, and anchors 105. The microvalve 100 can further include an actuator to make the microvalve movable, such actuators including magnetic actuators, piezoelectric actuators, thermal actuators, and electrostatic actuators. The microvalve 100 and components are preferably made of polymer based material, making the microvalve 100 and components inert. The microvalve 100 is capable of moving vertically, "Popping-up", to allow fluid to flow via the microvalve 100. FIG. 1 (b) shows the microvalve 100 in a closed position, wherein the microvalve 100 is held in place via anchors 105. When popping-up, the anchor 105 hold the microvalve 100 in place. The legs 103 facilitate the pop-up of the valve plug 101 while continuing to hold the valve plug 101 in place.

Figure 2:
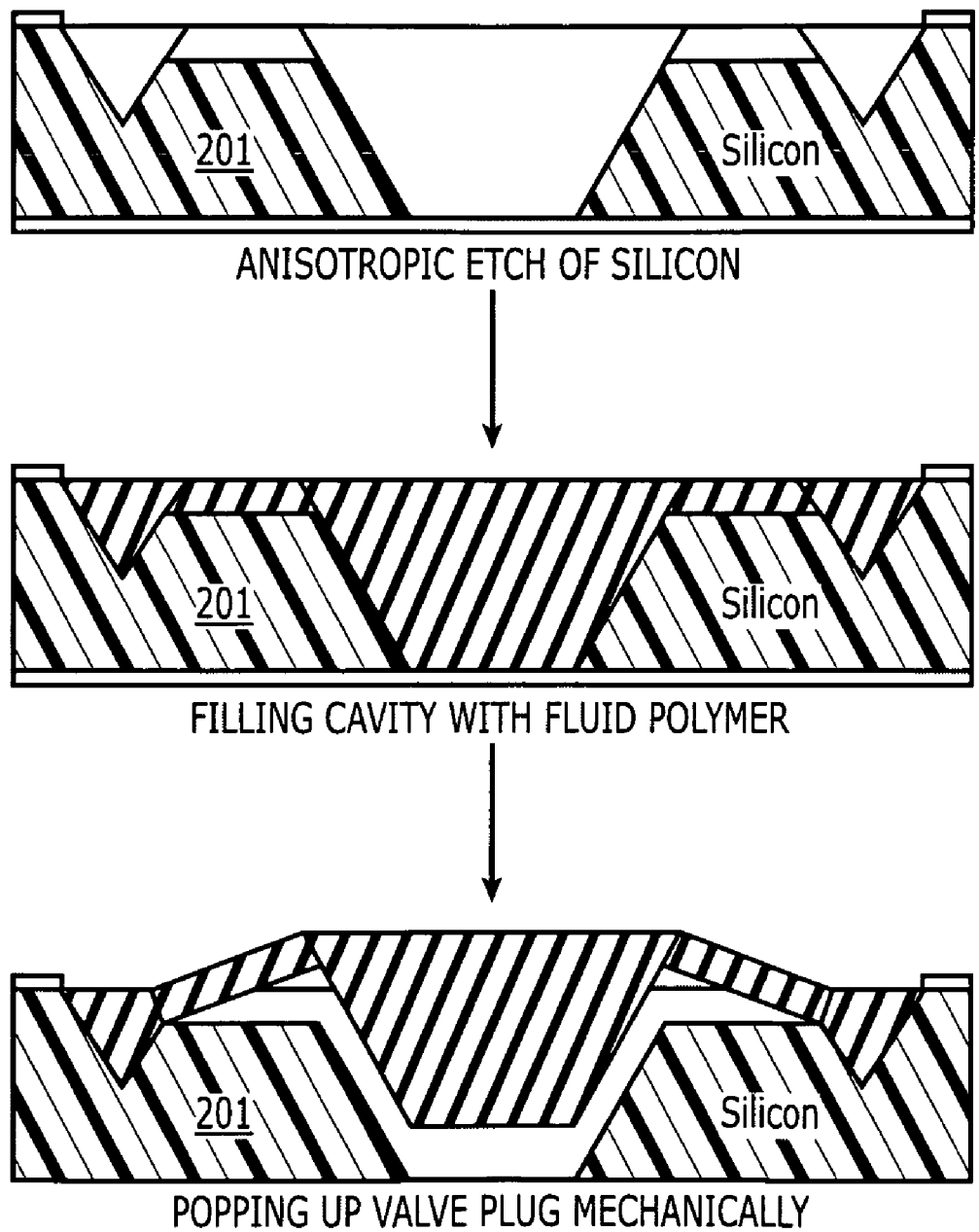
FIG. 2 shows the method of manufacturing the microvalve of the present invention.

FIG. 2 shows a method of making the present microvalve, including the steps of anisotropic etching of silicon member 201, filling cavity with fluid polymer 203, and popping up the valve plug of the microvalve 205.

Anisotropic etching of silicon member 201 occurs through the use of an agent, such as potassium hydroxide. Etching should bring about various cavities having different depths. In a preferred embodiment, etching results in a plug cavity, anchor cavities positioned on either side of the plug cavity, and leg cavity connecting both anchor cavities to the plug cavity.

Etching occurs through the use of an etchmask, such as, for example, silicon nitride, silicon oxide, or a silicon nitride/silicon oxide bi-layer.

The various cavities are then filled with a fluid polymer 203. The fluid polymer 203 hardens following injection into the cavity. Suitable polymers include silicone rubbers, such as polydimethylsiloxane (PDMS). The polymer is inert to harsh chemicals, acids, bases, and solvents. In one embodiment, the polymer is mixed with magnetic materials.

After hardening of the fluid polymer, the resulting valve is capable of popping up, 205, exposing the microvalve opening.

The present microvalve is capable for use as a check valve to allow fluid or gas to flow in one direction while stopping flow in the reverse direction. The present microvalve also shows use in a mammal body.

Figure 3A:
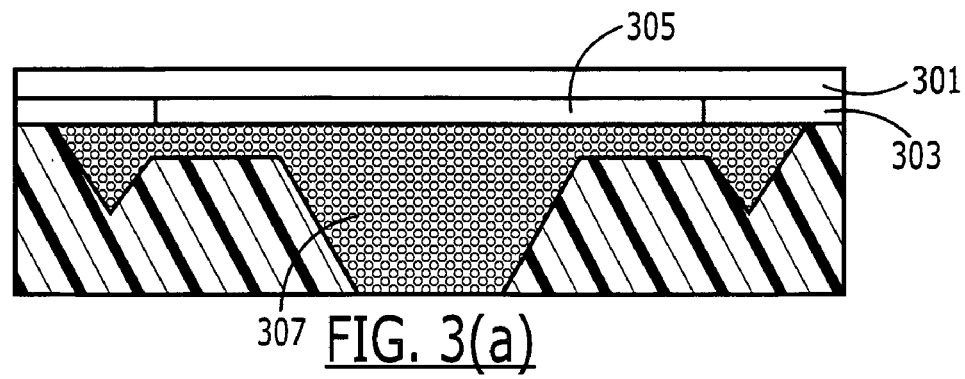
FIG. 3 shows the present microvalve as used as a drug release system.
Figure 3B:
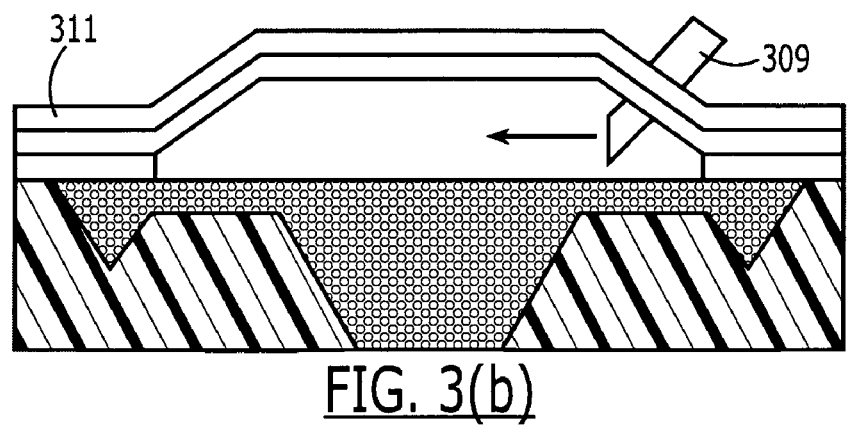
Figure 3C:
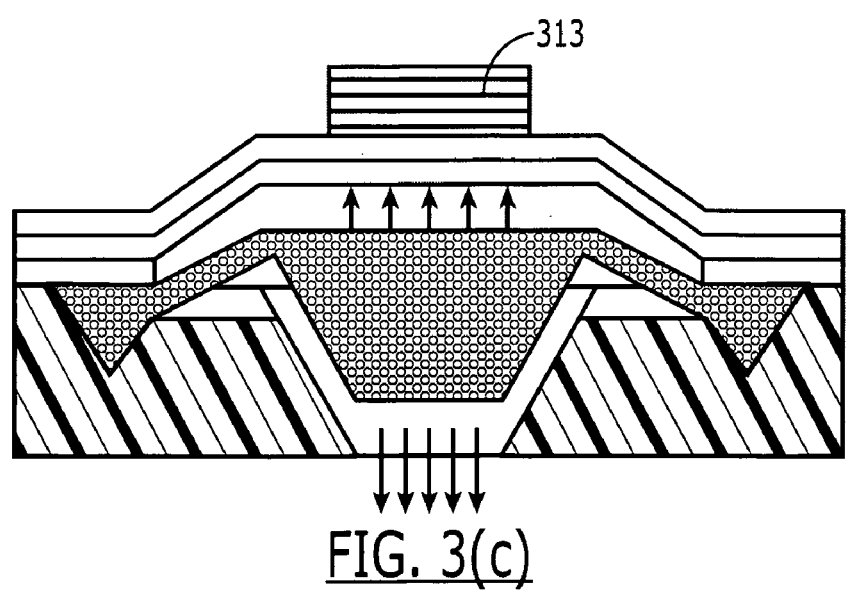

FIG. 3 exhibits an example of the present microvalve used as an implantable drug release system. In this example, the microvalve is capable of being inserted under the skin 311 of a user. The microvalve includes a polymer cover 301, a polymer spacer 303, the desired drug 305, and a plug made from a polymer/metal material mixture 307. In use, drug 305 can be inserted into the microvalve through a needle insert 309. When it is desirable to release the drug 305, a magnetic source 313, such as an electromagnetic coil, is positioned on the skin of the user adjacent to the microvalve. The magnetic source 313 is capable of attracting the plug 307 due to the metal materials present in the plug 307. The movement of the plug 307 releases the drug 305. When the magnetic source is removed, the plug 307 moves back into a closed position. The movement of the plug from a closed to an open position is due to the legs and anchors attached to the plug.

Figure 4A:
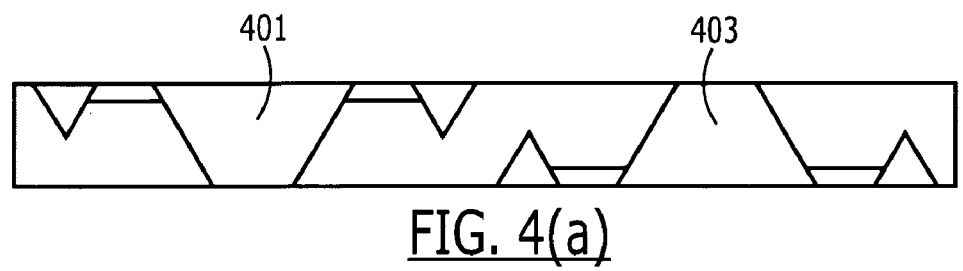
FIG. 4 shows an example system incorporating the present microvalve.
Figure 4B:
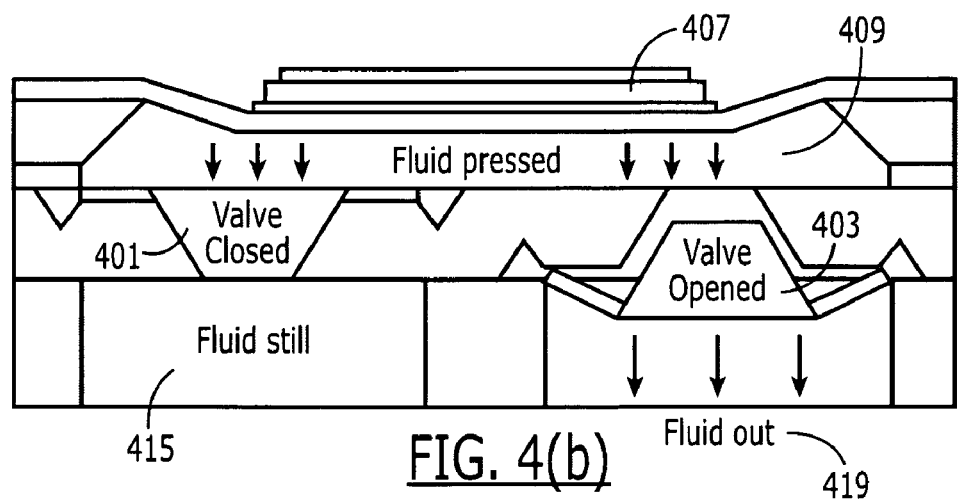

FIG. 4 shows a micropump incorporating microvalves of the present invention. In this device, two microvalves (401 and 403) are positioned on opposite sides of micropump (FIG. 4(a)). In use, an actuator 407, such as a piezoelectric actuator, is positioned at the top of the micropump. The actuator 407 compresses fluid 409 present in the pump. The fluid 409 is forced to the valve section of the pump. Due to the configurations of the valves 401/403, one valve opens while another remains closed. The fluid 409 flows to push the valve 403 open and flow through it. Fluid 409 is capable of flowing out 419 of the pump. Vice versa, the pump is capable of accepting fluid with actuator 407 is driven in the reverse direction. In this case, the previously fluid in still 415 moves to the chamber 409 of the pump. This occurs by opening the previously closed valve 401 and by closing the previously opened valve 405. Both valves 401/403 are capable of being opened and closed due to the fixing of the microvalve through the anchors.

Figure 5:
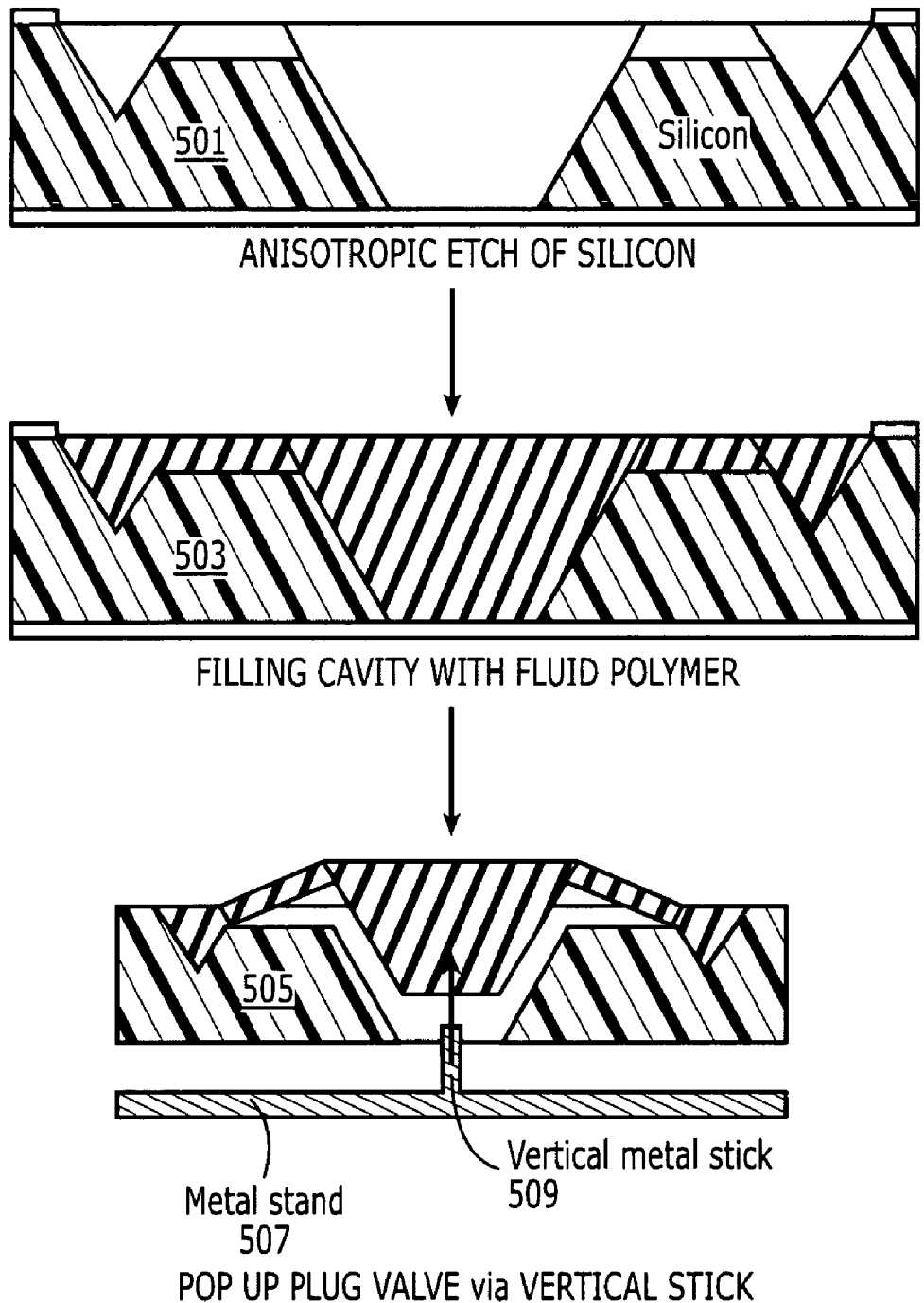
FIG. 5 is an embodiment of a method of the popping up mechanism of the present microvalve.

FIG. 5 is another embodiment of the popping up mechanism of the present microvalve. Alike the method in FIG. 2, a silicon member is first anisotropically etched 501. This is followed by filling the resultant cavity with a fluid polymer 503, such as polydimethylsiloxane. In this embodiment, the valve plug is popped up through the use of a vertical stick 509. The vertical stick 509 is preferably a metal, for example aluminum or stainless steel. The vertical stick 509 can be positioned on a stand 507, also made of a metal. Preferably, the stand 507 is of sufficient size to allow a matrix of vertical metal sticks, which would correspond with a matrix of microvalves.

Figure 6:
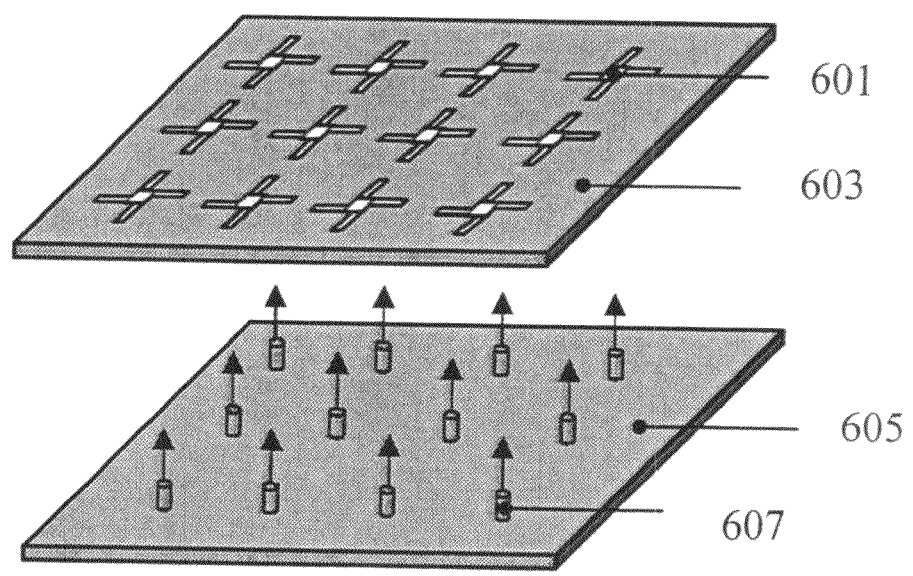
FIG. 6 is an exemplary embodiment showing the wafer-level-mass-processed array of vertical metal sticks for the popping up of the microvalves.

FIG. 6 is an embodiment showing the wafer-level-mass-processed array of vertical metal sticks for the popping up of the microvalves. An array of microvalves, 601, are produced with the method in FIG. 2 on a silicon substrate, 603. The popping up of the microvalves is achieved with the use of an array of metal sticks, 607, cast on a metal substrate, 605. The substrate can be made of a metal such as aluminum or stainless steel.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A microvalve, comprising:
   a silicon member having a cavity with sloped sidewalls;
   a valve plug configured to seal the cavity when it is in a closed position, and moves vertically upward when it is in an opened position, the valve plug is shaped corresponding to the sloped sidewalls of the cavity;
   a pair of polymer connecting legs attached to the valve plug, the pair of polymer connecting legs are configured to secure the valve plug when it is in the closed or opened position;
   a pair of anchors attached to the connecting legs configured to hold the connecting legs with the silicon member; and
   an actuator configured to open and close the valve plug,
   wherein the valve plug and the pair of polymer connecting legs are concealed in the cavity when it is in the closed position.

2. The microvalve of claim 1, wherein said valve plug is made from a polymer based material.

3. The microvalve of claim 2, wherein said polymer based material is polydimethylsiloxane (PDMS).

4. The microvalve of claim 2, wherein said valve plug further comprises a magnetic material.

5. The microvalve of claim 1, wherein said actuator is selected from the group consisting of magnetic actuator, piezoelectric actuator, thermal actuator, and electrostatic actuator.

6. A transdermal drug releasing microvalve adapted to be inserted under skin, comprising
   a silicon member having a cavity with sloped sidewalls;
   a polymer valve plug configured to seal the cavity when it is in a closed position, and moves vertically upward when it is in an opened position, the valve plug is shaped corresponding to the sloped sidewalls of the cavity;
   a pair of connecting legs attached to the polymer valve plug in which the pair of polymer connecting legs are configured to secure the valve plug when it is in the closed or opened position;
   a pair of anchors attached to the connecting legs configured to hold the connecting legs with the silicon member;
   a polymer spacer;
   a drug storage area located on top of the polymer valve plug, the drug storage area is adapted to accept and store a drug; and
   an actuator positioned on top of the skin in which the actuator is configured to open and close the polymer valve plug,
   wherein the polymer valve plug and the pair of polymer connecting legs are concealed in the cavity when it is in the closed position.

7. The transdermal drug releasing microvalve of claim 6, wherein said polymer valve plug is a polymer/magnetic material mixture.

8. The transdermal drug releasing system of claim 6, wherein said actuator is a magnetic actuator.

* * * * *